United States Patent

[11] 3,631,446

| [72] | Inventor | Donald D. Setser<br>1901 S. Fulton, Tulsa, Okla. 74112 |
|------|----------|-------------------------------------------------------|
| [21] | Appl. No. | 751,984 |
| [22] | Filed | Aug. 12, 1968 |
| [45] | Patented | Dec. 28, 1971 |

[54] SLEEP-SENSING DEVICE FOR USE ON AUTOMOTIVE VEHICLES
5 Claims, 4 Drawing Figs.

[52] U.S. Cl. .................................................. 340/279,
180/97, 200/61.54, 340/52 R, 340/263
[51] Int. Cl. ............................................. G08b 21/00
[50] Field of Search............................................ 180/97;
200/61.54, 61.55, 61.56, 61.57; 340/52 D, 52 F,
56, 279, 263

[56] References Cited
UNITED STATES PATENTS

| 3,222,639 | 12/1965 | Kayser, Jr. .................... | 340/279 |
| 3,186,508 | 6/1965 | Lamont ........................ | 340/279 |
| 3,222,640 | 12/1965 | Wurst ........................... | 340/279 |
| 3,227,998 | 1/1966 | Platt ............................. | 340/279 |

Primary Examiner—John W. Caldwell
Assistant Examiner—J. Michael Bobbitt
Attorneys—Griswold & Burdick and Earl D. Ayers ABSTRACT: This invention relates to means for detecting sleepiness or drowsiness in a driver of an automotive vehicle. An electrical sensing switch is coupled to the steering mechanism of the vehicle whereby the normal moving of a steering wheel results in frequency movement and actuation of the contacts of the switch.

Actuation of the multicontact switch either charges a charge transfer condenser or, depending on movement of the vehicle's steering wheel, transfers the charge of the transfer condenser to a rate or counter circuit whose output is coupled a relay which when deactivated, for example, actuates an alarm powered by voltage generated by means coupled to the drive means of an automotive vehicle.

Lack of normal steering movement results in the deactivation of the relay and actuation of the alarm when predetermined speed of the vehicle occurs.

Patented Dec. 28, 1971

INVENTOR.
Donald D. Setser
BY Earl D. Ayers
AGENT 3,631,446

SLEEP-SENSING DEVICE FOR USE ON AUTOMOTIVE VEHICLES

BACKGROUND OF THE INVENTION

This invention relates to apparatus for detecting sleepiness or drowsiness of the driver of an automotive vehicle and for producing a warning or detection of such sleepiness or drowsiness.

THe problem of detecting sleepiness or drowsiness in a driver of a motor vehicle has been prevalent since the development of automotive transportation.

Attempts to solve the problem have included foot switches which must be kept activated by pressure applied by the driver's foot, with an alarm sounding when the drowsy driver inadvertently moves his foot. Another device utilizes a set of electrical contacts attached to the eyelids of the driver. Closing of the driver's eyes completes the electrode contacts and actuates an alarm.

The prior art attempts to solve the problem of the sleepy or drowsy driver have had one or more shortcomings.

Either the devices have been attached to the driver or the driver must retain physical contact with the device, and such features are not as acceptable as is desired.

Accordingly, a principal object of this invention is to provide improved apparatus for sensing sleepiness or drowsiness in a driver of a motor vehicle.

Another object of this invention is to provide an improved apparatus for detecting sleepiness or drowsiness of a driver of a motor vehicle in which the apparatus is not contacted by the driver.

In accordance with this invention there is provided apparatus for sensing drowsiness of an operator of a motor vehicle which includes a multiple contact sensing switch coupled to or actuated by movement of the steering mechanism of the motor vehicle, means for feeding a signal which is a function of the rate of movement of the steering mechanism to a rate or counter amplifier circuit. A relay or relay substitute coupled to the output of the amplifier circuit closes an alarm circuit under predetermined steering activity conditions. The alarm circuit is usually powered by a generator which develops the alarm signal actuating potential as the vehicle reaches or exceeds a predetermined speed.

The invention, as well as additional objects and advantages thereof, will best be understood when the following detailed description is read in connection with the accompanying drawing, in which.

Figure 1:
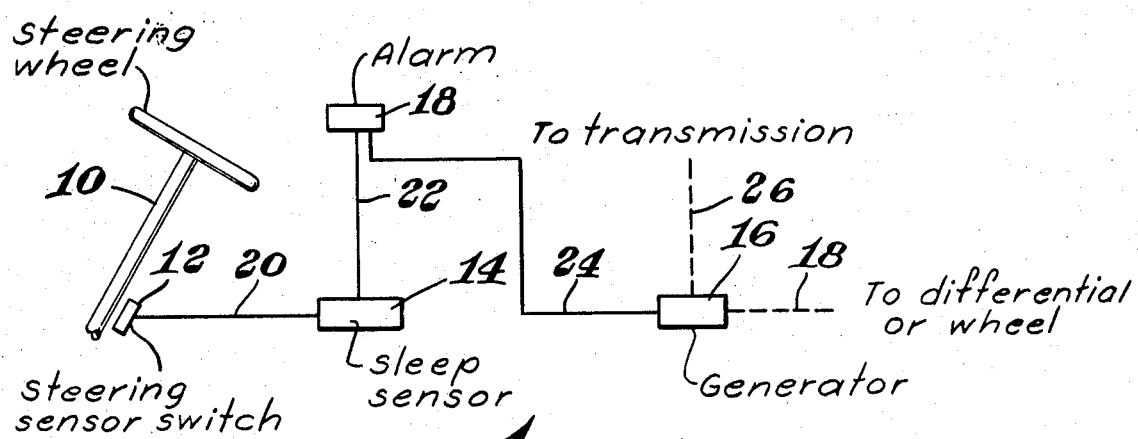
FIG. 1 is a diagrammatical view of apparatus in accordance with this invention.

Referring now to the drawings, and particularly to FIG. 1, there is shown steering apparatus 10 for a motor vehicle (not shown) having a steering sensor switch 12 mechanically coupled thereto. The switch 12 is electrically coupled by cable 20 to a sleep sensor circuit 14 which is coupled by means 22 to an alarm 18, such as a bell or flashing light, for example. The generator 16 is coupled to the vehicle's transmission or differential by mechanical coupling means 26 or 18 and to the alarm by means 24.

Figure 2:
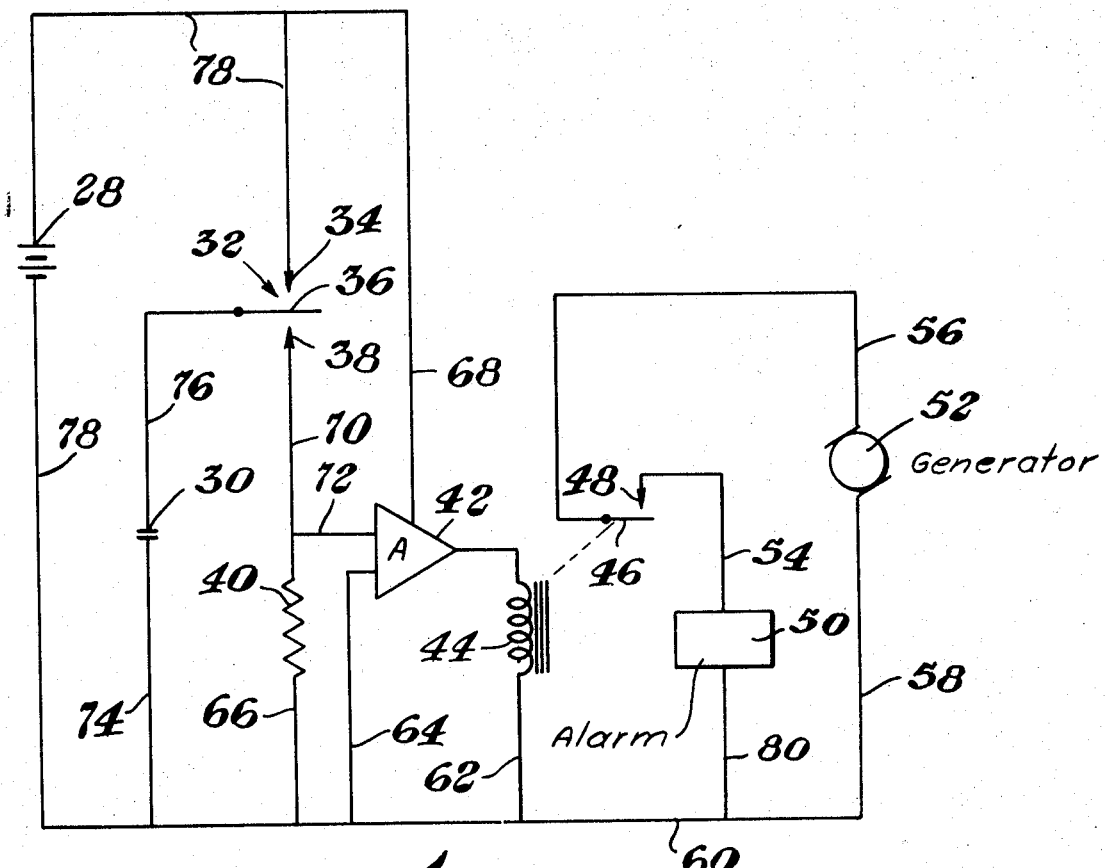
FIG. 2 is a schematic diagram of one embodiment in accordance with this invention.

Referring now to the circuits of FIG. 2, which is a manual time delay sensing apparatus, the steering sensor switch, indicated generally by the numeral 32, has its movable armature contact 36 coupled by means of wire 76 to one side of a charge transfer capacitor 30. One fixed terminal 34 of the switch 32 is coupled by means of wire 78 to a battery 28.

The other terminal of the electrical energy source or battery 28 is coupled to a common conductor 60 by means of a wire 78. The other terminal of the charge transfer capacitor 38 is coupled to the conductor 60 by means of a wire 74.

The second fixed terminal 38 of the switch 32 is coupled by means of wires 70, 72 to an input terminal of a rate or counter amplifier 42. Another input to amplifier 72 is coupled by wire 64 to the conductor 60. A resistance element 40 is coupled between the wire 72 and the conductor 60 by wire 66.

A wire 68 coupled to wire 78 (and so to battery 28), along with wires 64, 60, 78, supplies power to the amplifier 42.

A relay, of which the coil 44 is a part, has coil 46 coupled to the output of amplifier 42 and to the conductor 60 by wire 62.

The movable armature contact 46 of the relay is influenced by the degree of energization of the coil 44 and is electrically connected to one output of a generator 52 by means of wire 56. The other output of the generator is coupled to common conductor 60.

The fixed relay contact 48 is an input of an alarm device 50 whose other input is coupled by wire 80 to the common conductor 60.

In operation, normal movement, even though slight, of the steering apparatus 10 will cause the steering sensor switch (12 in FIG. 1, 32 in FIG. 2) to move its armature element 36 between the fixed contacts 34 or 38.

If the movable contact 36 sets against contact 34, energy from the direct current electrical energy source, battery 28, is fed into the charge transfer condenser 30. If the movable contact 36 is contacting fixed contact 38, energy from the charge transfer condenser 30 is transferred to the input of the rate or countercircuit amplifier 42.

If the electrical potential of the amplifier 42 is less than the pull in potential of the armature contact 46 because of insufficient rate of transfer of energy from the condenser 30, the movable armature contact 46 is connected to the contact 48 which completes a circuit placing alarm device across the output of the generator 57. If the motor vehicle to which the generator is coupled exceeds a predetermined speed, the voltage output of the generator 52 energizes the alarm device 50, such as a bell, for example, sufficiently to actuate the alarm device.

Unless movement of the steering apparatus occurs at a rate sufficient to charge the condenser 30 and then transfer the charge to the input of amplifier 42 at or exceeding a preset minimum rate, the alarm 70 will operate if the output of the generator 60 exceeds the above-mentioned preset amount.

Figure 3:
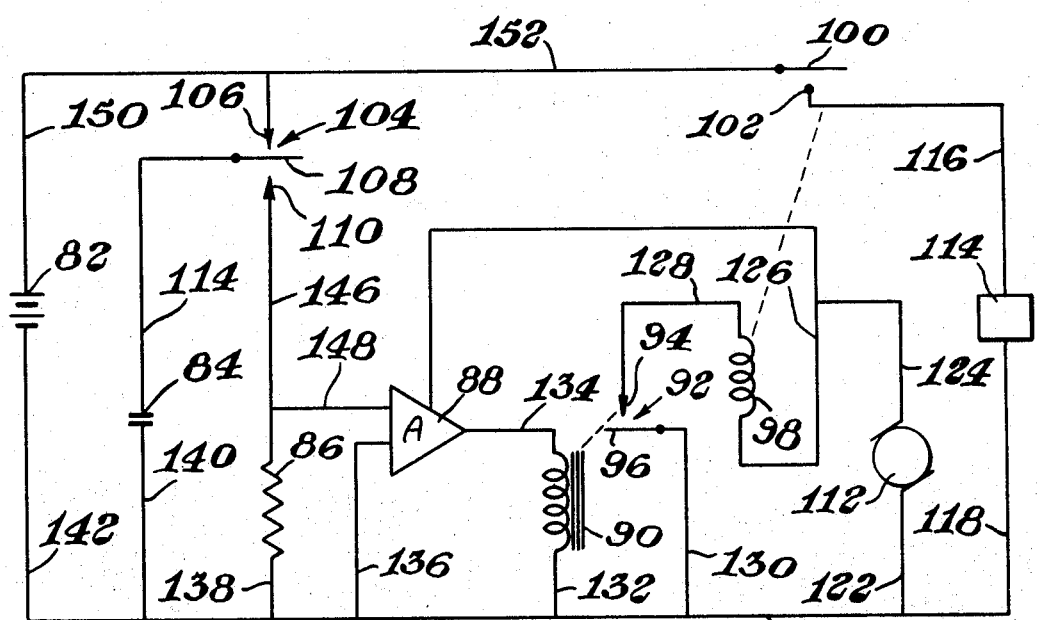
FIG. 3 is a schematic diagram of a modification of the embodiment of FIG. 2.

In the circuit of FIG. 3, the steering sensor switch 104 has its movable armature contact 108 coupled by means of wire 144 to one side of a charge transfer capacitor 84. One fixed terminal 106 of the switch 104 is coupled by means of wire 150 to a battery 82.

The other terminal of the electrical energy source or battery 82 is coupled to a common conductor 120 by means of a wire 142.

The second fixed terminal 110 of the switch 104 is coupled by means of wire 210 to an input of a rate or counter amplifier 88 such as are used in Geiger counters, for example. Another input to amplifier 88 (same, for example, as amplifier 42 in FIG. 2) is coupled by wire 136 to the common conductor 120. A resistance element 86 is coupled to conductor 148 and thence to the common conductor 120 by means of wire 138.

The coil 90, part of relay 92, is coupled by means of wires 132, 134 between the output of the amplifier 88 and the common conductor 120.

The generator 112, corresponding to generator 16 in FIG. 1, has its output coupled to conductor 120 through wire 122 and through wire 124 to one power input of the amplifier 88.

The fixed contact 94 of relay 92 is coupled through wires 128, 126 and relay coil 98 to one output of the generator 112 at conductor 124. The movable armature contact 96 of relay 92, influenced by the coil 90, is coupled to the common conductor 120 through wire 130.

The movable relay contact 100, influenced by the relay coil 98, is coupled to the battery 82 through wires 152 and 150. An alarm device 114 is coupled between the fixed relay contact 102, associated with coil 98, and the common conductor 120 by means of wires 116, 118.

The circuit of FIG. 3 is basically that of FIG. 2, except that the output of the generator 112 is used to power the amplifier 88 and actuate the relay contact 100 through coil 98, and the alarm 114 is powered by the battery 82, though actuated by means of the energization of relay coil 98 by the generator.

Thus, both the output of the amplifier 88 must be low enough to couple relay contacts 94, 96 (the result of too little vehicle-steering activity) and the generator output must be sufficient, reflecting predetermined vehicle speeds, to actuate relay contact 100 to couple it to terminal 102 and close the alarm circuit. The output of the amplifier is also a function of the voltage output of the generator which powers it, thus making the amplifier require more steering activity at higher driving speeds and thus higher operating voltage to prevent actuation of the alarm 114.

Circuits which do not utilize relays as such may also be used in accordance with this invention.

Figure 4:
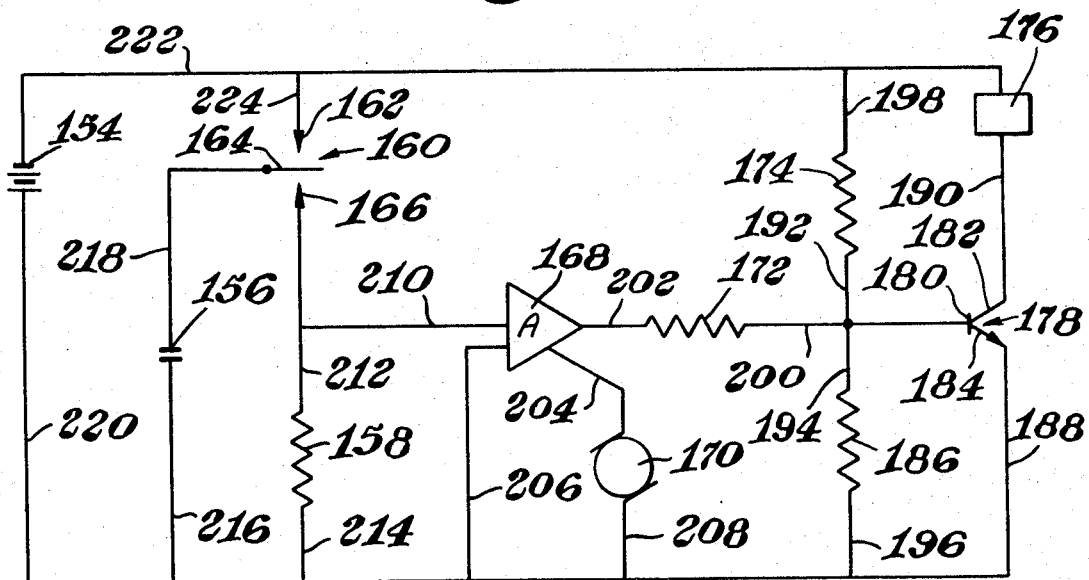
FIG. 4 is a schematic diagram of an alternative embodiment of this invention.

In FIG. 4, the sensing switch 160, corresponding to sensor switch 12 in FIG. 1, has its movable armature contact 164 coupled through wire 218 to condenser 156 whose other terminal is coupled by wire 220 to a common conductor 221. One fixed terminal 162 of switch 160 is coupled through wires 224 and 222 to the battery 154 whose other terminal is coupled to the common conductor 221 through wire 220.

The second fixed terminal 166 of switch 160 is coupled through wire 210 to an input of a rate or counter amplifier 168. A resistance element 158 is coupled via wires 212 and 214 between wire 210 and the common conductor 221. The other input to the amplifier 168 is coupled to common conductor 221 by wire 206.

A generator 170, corresponding to generator 16 in FIG. 1, powers the amplifier 168 and is coupled between the amplifier 168 and common conductor 221 by wires 204, 208.

The output of the amplifier is coupled through wires 202, 200 and resistance 172 to the base 180 of a transistor switch 178. The emitter 184 is coupled by means of wire 188 to the common conductor 221. An alarm device 176, such as a bell 176, for example, is coupled to the transistor collector 182 by wire 190 and is coupled to the battery 154 through wire 222.

A resistance 174 is coupled to wires 200 and 222 by wires 192, 198, respectively.

A resistance 186 is coupled between the wire 200 and the common conductor 221 by wires 194, 196, respectively.

THe output of the generator 170, being a function of the speed of the vehicle, results in nonoperation of the apparatus until at least a predetermined speed is reached.

The output of the amplifier 168 is such that when normal steering activity occurs the transistor switch 178 is biased so that very little current flows through the alarm 176.

When steering activity decreases (sleepy or drowsy driver) and the vehicle (not shown) is moving faster than the minimum operating speed necessary to provide generator output to power the apparatus, the output of the amplifier will decrease the bias of the transistor switch, allowing enough current to flow through the alarm 176 to properly actuate it.

The value of resistances 172, 174 and 186 are determined by the desired operating characteristics of the transistor switch 178 and output of the amplifier 168.

The position of the moving contact 164 of sensor switch 162 is independent of the operation of the amplifier 168 to determine the need to sound the alarm to awaken the driver.

What is claimed is:

1. Apparatus for sensing sleep or drowsiness of a driver of a motor vehicle or the like, comprising
   A. An electrical switch coupled to the steering apparatus of a motor vehicle, said switch being a single-pole double-throw-type switch, the coupling to said steering apparatus being such that a small movement of the steering apparatus moves the single pole of said switch to one throw or the other:
   B. a charge transfer condenser;
   C. a countercircuit including an amplifier, said circuit including an input and output;
   D. variable potential generator means for energizing said circuit, said generator means being mechanically coupled to the drive train of said vehicle and electrically coupled only to said circuit;
   E. means for electrically energizing said charge transfer condenser when said pole is at one throw of said switch;
   F. means for transferring electrical energy from said transfer condenser to the input of said countercircuit when said pole is at the other throw of said switch, and a relay having at least a coil, a movable contact and a fixed contact;
   G. switching means coupled to and actuated by the output of said countercircuit, said switching means having contacts across which a series connected alarm device and alarm energization source are connected whereby when the output of said countercircuit reaches a predetermined value said switch is actuated to cause conduction across said contacts and actuate said alarm device.

2. Apparatus in accordance with claim 1, wherein said means for electrically energizing said charge transfer condenser is a fixed source of direct current.

3. Apparatus in accordance with claim 1, wherein said alarm device provides an audible output signal.

4. Apparatus for sensing sleep or drowsiness of a driver of a motor vehicle of the like, comprising
   A. an electrical switch coupled to steering apparatus of a motor vehicle, said switch being a single-pole double-throw switch, the coupling to said steering apparatus being such that a small movement of the steering apparatus moves the single pole of the switch to one terminal or another;
   B. a charge transfer condenser;
   C. a countercircuit including an amplifier, said circuit including an input and output;
   D. means for electrically energizing said countercircuit;
   E. means for electrically energizing said charge transfer condenser when said pole is at one throw of said switch;
   F. means for transferring electrical energy from said transfer condenser to the input of said countercircuit when said pole is at the other throw of said switch;
   G. a transistorized switch coupled to and actuated by the output of said countercircuit, and
   H. a series connected alarm device and alarm device variable energization source whose output is a continuous function of vehicle speed coupled across said transistorized switch whereby, when the output of said counter circuit reaches a predetermined level and the output of said energization source exceeds a predetermined value, said transistorized switch is actuated to energize said alarm device.

5. Apparatus in accordance with claim 1, wherein said switching means is an electromagnetic coil actuated relay coupled to the output of said countercircuit.

* * * * *